INVENTOR
PAUL E. STUCKERT

ATTORNEY

FIG. 2
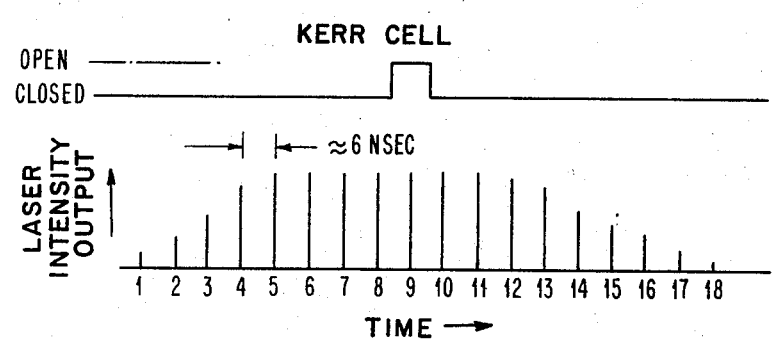
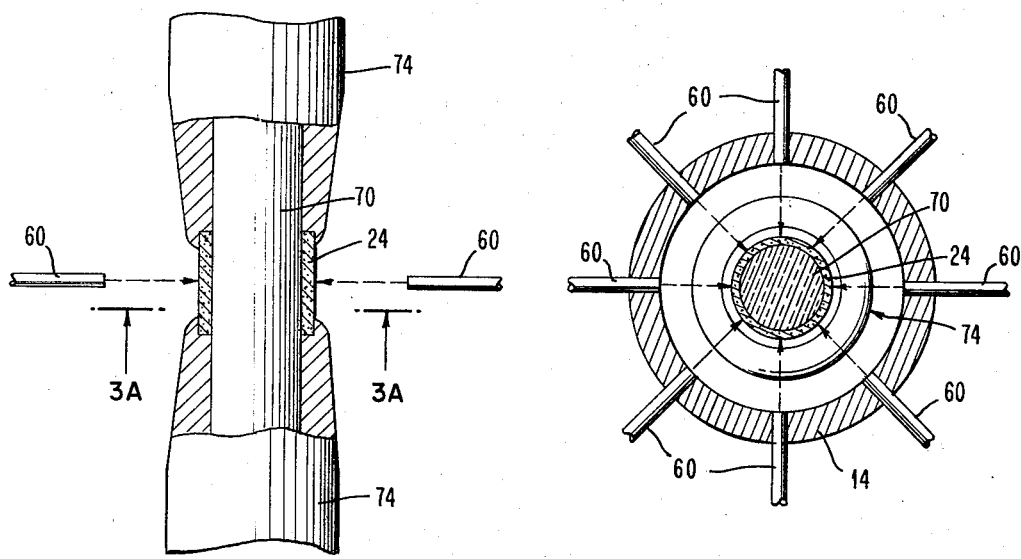
FIG. 3
FIG. 3A 3,509,351
LASER CONTROLLED HIGH SPEED PULSE GENERATOR
Paul E. Stuckert, Katonah, N.Y., assignor to International Business Machines Corporation, Armonk, N.Y., a corporation of New York
Filed Jan. 15, 1968, Ser. No. 697,823
Int. Cl. H01j *39/12;* H04b *3/04;* H03k *5/00*
U.S. Cl. 250—217                                                13 Claims

ABSTRACT OF THE DISCLOSURE

The pulse generator produces outputs at one end of a coaxial transmission line which is terminated in the characteristic impedance of the line. A section of the inner conductor of the line is formed of high resistivity silicon. A light pulse of very short duration, about five picoseconds, produced by a mode locked laser is applied to the silicon section. The light pulse raises the conductivity of the silicon and causes to be produced across the characteristic impedance termination an output pulse having a rise time substantially equal to the duration of the applied light pulse.

FIELD OF INVENTION

The invention relates to a high speed pulse generator of the type having rise times in the picosecond range. More specifically, the pulse generator is formed by the combination of a transmission line containing a photoconductive section with a laser which produces output light pulses of extremely short duration.

PRIOR ART

Pertinent prior art is found in the following.
(a) R. L. Garwin, Review of Scientific Instruments, 21, 903 (1950).
(b) A. J. DeMaria, D. A. Stetser and H. Heynau, Applied Physics Letters, 8, 174 (1966).
(c) M. DiDomenico, Jr., J. E. Geusic, H. M. Marcos, and R. G. Smith, Applied Physics Letters, 8, 180 (1966).
(d) "Demodulation of Low-Level Broad-Band Optical Signals with Semiconductors," H. S. Sommers, Jr., E. K. Gatchell, Proceedings of the IEEE, vol. 54, No. 11, November, 1966, pp. 1553–1568.
(e) U.S. Patent No. 3,308,394, "Optical Resonant Cavities," issued Mar. 7, 1967 to E. Snitzer et al.

SUMMARY OF THE INVENTION

Though, as is evident from the prior art listed above, high speed pulse generators have been designed to deliver electrical pulses having rise times in the picosecond range, most such generators have not been able to deliver pulses with rise times of less than 100 picoseconds. Further, though light pulses have been produced with durations of less than 10 picoseconds using mode locked lasers, and lasers have been combined with light responsive components placed in a waveguide, prior to the subject invention these elements have not been combined in such a way as to take advantage of the very short duration of the type of pulses which have been produced by mode locked lasers to provide electrical pulses having extremely fast rise times. The need for such pulses having extremely fast rise times has accompanied the development of faster and faster electronic components which operate in the nanosecond and subnanosecond range. In accordance with the principles of the present invention a pulse generator capable of producing such pulses is provided which is not only faster in terms of the rise time of the pulses it produces, but is one in which the coaxial line on which the pulses are produced can be fabricated with smaller discontinuities than has been possible with the lower rise time pulse generators of the prior art.

Therefore, it is an object of the present invention to provide a pulse generator which produces electrical pulses having extremely fast rise times.

It is a further object to produce a pulse generator of the above described type using a transmission line and a variable impedance element, which can be inserted in the line without producing a severe discontinuity.

It is a further object of the present invention to produce a pulse generator which is capable of taking advantage of the very short duration light pulses which are produced by lasers and to respond to these pulses to produce electrical pulses within the same time scale.

The foregoing and other objects, features and advantages of the invention will be apparent from the following more particular description of preferred embodiments of the invention, as illustrated in the accompanying drawings.

In the drawings:

FIG. 2 is a timing diagram illustrating a series of output pulses for the mode locked laser of FIG. 1 as well as the time coincidence with which the Kerr cell is activated to pass a single one of the pulses in a series to the transmission line.

FIG. 3 is a more detailed showing of that portion of the transmission line of the embodiment of FIG. 1 which includes the variable impedance element to which the light pulses are applied.

FIG. 3A is a sectional view of FIG. 3 which illustrates in more detail the manner in which the light pulses from the laser is transmitted via optical fibers and applied to the variable impedance element in the transmission line.

Figure 1:
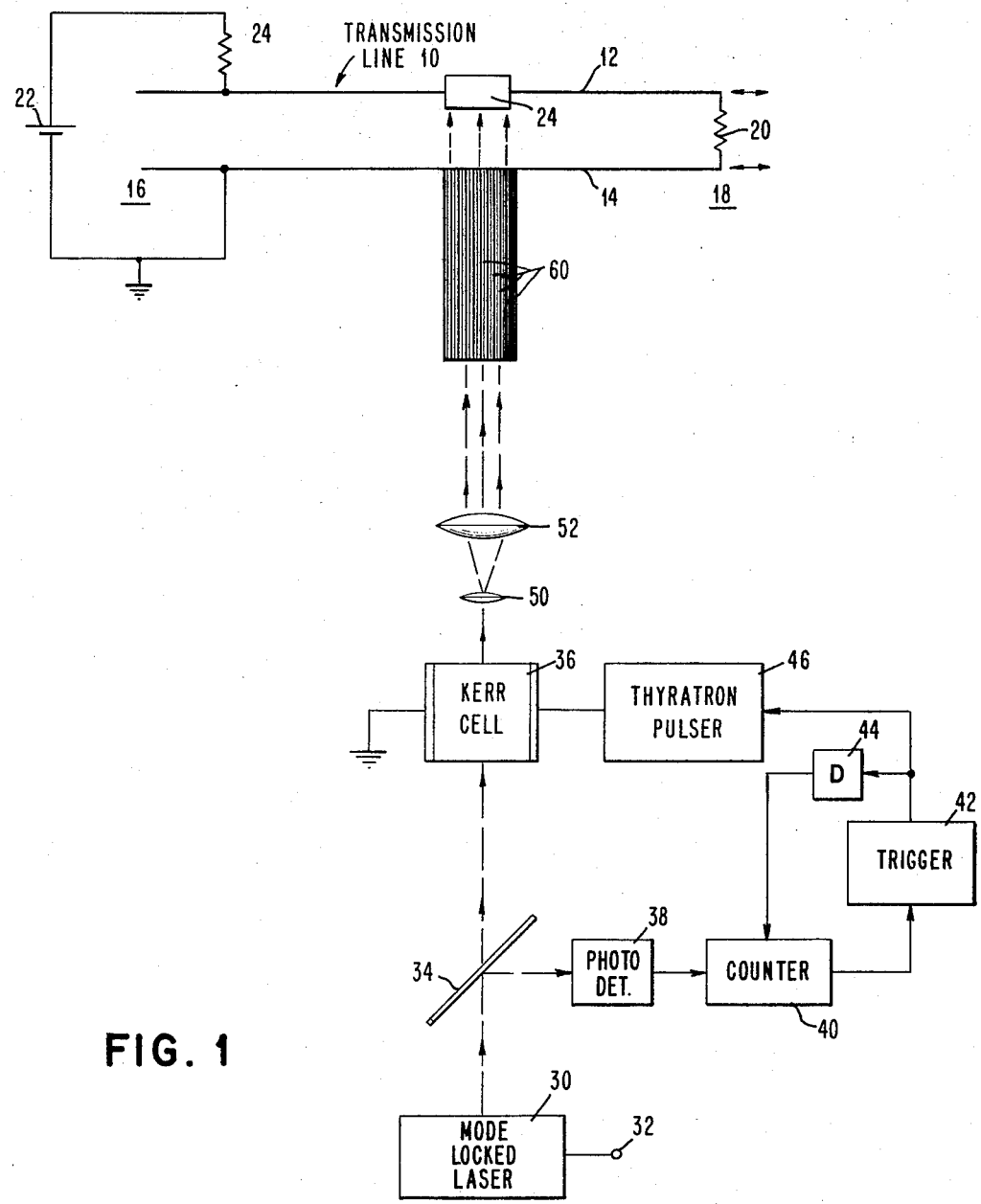
FIG. 1 is a schematic representation of an embodiment of the present invention.

In the embodiment shown in FIG. 1, the transmission line on which the fast rise time pulses are produced is a coaxial line generally designed 10. Coaxial line 10 includes an inner conductor 12 and an outer conductor 14. One end 16 of line 10 is open circuited and the other end 18 is terminated by an impedance element in the form of a resistor 20 which matches the characteristic impedance of line 10. The coaxial line 10 is energized by a voltage source 22 through a high impedance 24 connected so that the outer conductor 14 of the line is at the reference potential indicated to be ground. The outer conductor 14 is a continuous conductor having high conductivity. Inner conductor 12 is formed primarily of high conductivity material but includes a short section 24 of silicon which is prepared so that it exhibits a high resistivity. With this arrangement, when the line 10 is energized to a voltage E by source 22, after the transients accompanying the initial application of the voltage, the applied voltage E appears principally across the high resistance silicon section 24 of inner conductor 12.

Coaxial line 10 is activated to produce the desired fast rise time electric pulses by applying to silicon section 24 light pulses which have an extremely short duration and a wavelength such that the applied light is absorbed by the silicon and a photoconductive effect is produced which renders the silicon highly conductive. More specifically, when an applied light pulse of this type is applied having a wavelength such that the photon energy is greater than the band gap for the silicon section, the applied light is absorbed by moving electrons from the valence band to the conduction band in the silicon. As a result, hole-electron pairs are produced in the silicon which sharply reduce the resistivity of section 10. The physical mechanism, that is, the absorbing of photons and the production of hole-electron pairs, occurs within the material in very short times, much less than $10^{-12}$ sec. As a result, the change in resistivity in silicon section 20 is produced in a time which is generally comparable to the rise time and duration of the light pulses which are applied to the line. Each such light pulse, applied to the line in a manner to be described below, has a duration of about 5 picoseconds ($5 \times 10^{-12}$ sec.).

When such a pulse is applied to section 24, by the photoconductive effect described above, this section of inner conductor 12 becomes conductive. The voltage across this previously high resistance section, which is here taken to be equal to the applied voltage E, causes two voltage transistors, or steps, of equal amplitude $E/2$ and opposite polarity, to be directed from section 24 in opposite directions toward the two ends 16 and 18 of coaxial line 10. When the voltage step traveling toward the right reaches the characteristic impedance termination at 18, a voltage appears across resistor 20. The rise time of this voltage is comparable to the duration of the applied light pulse, that is about 5–10 picoseconds. The voltage step traveling from section 24 to the left end of the line is reflected at the open circuit termination at 16. The voltage step, which is reflected without reversal, then travels along the line to the right until it reaches termination 18 and at this time terminates the output voltage across resistor 20. The duration of the output pulse achieved under the conditions of operation described above is equal to twice the electrical length of that portion of coaxial line which extends between the silicon section 24 and the open circuit termination at 16. This follows from the fact that the voltage step of $E/2$, which initially travels to the right and initiates the output pulse, is separated in time by this amount from the voltage step of $E/2$ of opposite polarity, which initially travels to the left and is reflected from open circuited termination 16 to the load at 18 to lower the output voltage across resistor 20 to its original value.

The above described mode of operation occurs when the electrical length of the portion of line 10 between section 24 and the open circuited termination 16 is shorter than the time required for the hole-electron pairs produced in silicon section 24 to be either swept out of the body or to recombine. At this time the section 20, of course, reverts to its initial high impedance state and if this occurs before the pulse traverses the line 10 from section 20 to termination 16 and back to section 20 then the duration of the output pulse at section 20 is determined by the time at which section 24 reassumes its high resistance state. In such a case, the pulse shape is less square, but in either mode of operation the shape of the leading edge of the pulse is unchanged, and it has a rise time of about 5–10 picoseconds which is determined by the shape and duration of the input light signal.

The input light signals applied to the transmission line 10 are produced by a mode locked laser, represented schematically in FIG. 1 by block 30 having an input activating terminal 32. The structure and mode of operation of mode locked lasers of this type are illustrated in the Applied Physics Letters articles by DeMaria et al., and DiDomenico et al., which are cited as references (b) and (c) above in the prior art section of this application. Since the mode locked laser, as used in the embodiment of FIG. 1, is not itself operated in other than a conventional way, and is but one of the elements in the over-all novel combination of elements in this embodiment, no detailed explanation of the structure or mode of operation of this device is included in this application. Such lasers, when actuated, produce outputs in the form of a series of discrete light pulses, as indicated in FIG. 2. In this figure a series of 18 pulses is shown. The pulses increase in intensity until a relatively high intensity is achieved and then decrease in intensity. The wavelength of the light pulses in the series is determined by the particular laser which is used and when, as here, a neodymium doped laser of the type described in reference (c) above is employed, the output is at a wavelength of 1.06 microns. The duration of the pulses in this series is so short that they are extremely difficult to measure but recent measurements have been made indicating durations as short as 5 picoseconds.

Each of the 18 pulses illustrated by one of the lines in FIG. 2 has a duration of about 5–10 picoseconds and the time interval between pulses is about 6–10 nanoseconds. Mode locked lasers when so activated produce a series of pulses having these characteristics followed by another series of light pulses with the spacing between the series being in the order of seconds. The series of output light pulses produced by mode locked laser 30 of FIG. 1, is applied to a split mirror 34 which passes the majority of the light to a Kerr cell 36. At the same time a portion of the light in each pulse is reflected to a photodetector 38. Kerr cell 36 is normally in an off condition so that the light pulses applied to this cell do not pass through the cell. Photodetector 38, however, produces an electrical output pulse in response to the application of each light pulse. These electrical output pulses are applied to a counter 40. This counter, in the present embodiment, is an eight position counter which upon receipt of eight pulses delivers an output to a trigger 42. Trigger 42 has its output connected to both a delay device 44 and a thyratron pulser 46. The circuit of thyratron pulser 46 is designed to deliver a single output voltage pulse to Kerr cell 36 to open this Kerr cell so that the next light pulse applied to the cell is allowed to pass through it.

The timing arrangement is illustrated in FIG. 2 indicating that the Kerr cell is so activated that only the ninth pulse in the series of light pulses passes through this cell. This light pulse passes through the Kerr cell and is applied through a pair of lenses 50 and 52 to a number of optical fibers schematically represented at 60. These optical fibers are passed through the outer conductor 14 of coaxial line 10 and transmit the light through this conductor and direct it upon the silicon section 24 of inner conductor 12. Trigger 42, which is activated by the output produced when counter 40 receives the eighth input of a series, delivers only a single signal to the thyratron pulser so that Kerr cell 36 is open only during the ninth light pulse in the series produced by laser 30. This output from trigger 42 is also passed through the delay device 44 to reset counter 40 after a suitable time in preparation for the next series of light pulses which are produced by mode locked laser 30.

Though in the above described operation the counter 40 is an eight position counter, and the control circuit of which this counter forms a part responds to the eighth light pulse in the series to open the Kerr cell to pass the ninth pulse, because of the very short time intervals involved, it may be preferable in some applications to introduce sufficient delay in the circuit so that the Kerr cell is not opened until after the ninth pulse, and the tenth or a subsequent pulse is passed through this cell. This mode of operation places less stringent requirements upon the response times of the electronic elements in the control circuit. A delay is also present in the device due to the time it takes the light pulse to propagate from split mirror 34 to Kerr cell 36. A light pulse, traveling in air, travels a distance of approximately one foot in one nanosecond and, therefore, the delay involved can be controlled by controlling the spacing of the split mirror 34 and Kerr cell 36. In any event, the electro-optical circuit is operated so that the control circuit responds to one or more of the light pulses in the series to open Kerr cell 36 to pass a subsequent one of the light pulses in the series to the transmission line 10.

A more detailed showing of the structure of the inner conductor 12 of transmission line 10 is included in FIG. 3. This conductor is formed of an insulating substrate 70, which is here sapphire, on which there is deposited, for example by epitaxial growth, a very thin layer of silicon 24. As is illustrated in the sectional view of FIG. 3A, the sapphire substrate 70 is circular and the silicon layer 24 is deposited completely around this substrate. The main portion of the conductor 12 is formed by an aluminum deposit 74 on the sapphire substrate which extends to and overlaps the edges of the silicon section 24. In this way the silicon section forms a high impedance bridge between the aluminum conductor sections of the line. Further, though it is not possible to avoid all discontinuities in the transmission line in such a design, the discontinuities can be minimized to be less than those produced by other types of switches.

The cross-sectional view of FIG. 3A also illustrates the manner in which the optical fibers are passed through channels in the outer conductor 14 of the coaxial line and apply the light to much of the surface of the silicon section 24. These optical fibers are very small in diameter and only very small channels need be provided in outer conductor 14 of the transmission line to receive these fibers. Each of the fibers carries a portion of the light in the light pulse from the mode locked laser. This light is passed through the lenses 50 and 52 shown in FIG. 1 and then applied to the optical fibers. These fibers are arranged so that the length of each fiber is the same and each applies light at the same time to the silicon section 24 of inner conductor 12 of the coaxial line. The layer of silicon deposited on the sapphire is very thin, only about 1–2 microns. Section 24 then presents a very high resistance when it is in the normal state, and when the light input is applied, it penetrates essentially the whole body of silicon to render it conductive.

It is, of course, obvious that photoconductive materials other than silicon can be employed as long as they respond photoconductively to the light at the wavelength of the particular laser which is used as the light pulse source. Further, in the present practice of the invention, a mode locked laser of the type shown in FIG. 1 is preferred since lasers of this type produce the shortest duration output light pulses. Control circuitry of the functional type shown in FIG. 1 is necessary to combine this type of laser with a transmission line to produce the desired pulse generator. However, the practice of the invention, in its broadest sense, is not limited to lasers of this type. Where individual pulses of short duration can be produced, a control circuit of the type shown to select one of a series of pulses may not be necessary.

While the invention has been particularly shown and described with reference to perferred embodiment thereof, it will be understood by those skilled in the art that various changes in form and details may be made therein without departing from the spirit and scope of the invention.

What is claimed is:

1. A pulse generator for producing electrical pulses having fast rise times comprising:
    (a) means including a laser operable when activated to produce a short duration output light pulse having a predetermined wavelength;
    (b) a transmission line including at least first and second conductors, one end of said transmission line being terminated in an open circuit and the other end of said transmission line being terminated in an impedance matching the characteristic impedance of the transmission line;
    (c) voltage means connected across said line applying a voltage across said two conductors;
    (d) a section of the first conductor of said transmission line being a semiconductor normally exhibiting a high resistivity but photoconductively responsive to light at said predetermined wavelength to exhibit a low resistivity;
    (e) and means for activating said means including said laser to produce said short duration light pulse, said light pulse being directed to said semiconductor section of said first conductor of said transmission line.

2. The pulse generator of claim 1 wherein said laser is a mode locked laser which when activated produces a series of short duration output light pulses, and said generator includes between said laser and said semiconductor section of said first conductor of said transmission line a light switch to which said series of light pulses are applied for directing only one of the light pulses of said series to said semiconductor section.

3. The pulse generator of claim 2 wherein said light switch is a Kerr cell, and said generator includes a control circiut for applying a voltage to said Kerr cell to allow only said one pulse in said series to be directed to said semiconductor section.

4. The pulse generator of claim 3 wherein said control circuit includes a photodetector to which said series of light pulses are applied for producing electrical outputs in response to said light pulses, and means coupled to the output of said photodetector for applying said voltage to said light switch.

5. The pulse generator of claim 4 wherein said means connected to the output of said photodetector includes a counter which delivers an output which is coupled to said Kerr cell to cause a voltage to be applied to said Kerr cell after a predetermined number of the light pulses in the series have been applied to said photodetector, said Kerr cell responding to said voltage to allow a subsequent one of the pulses in the series to be directed to said semiconductor section.

6. The pulse generator of claim 1 wherein said transmission line is a coaxial line and said first conductor is the inner conductor of said line; and said first conductor comprises an insulating substrate, a layer of conductive material on said substrate having an interruption therein which is bridged by a layer of semiconductor material forming said semiconductor section of said first conductor.

7. The pulse generator of claim 6 wherein said light pulse is coupled to said semiconductor section by optical fiber means, said optical fiber means extending through said second conductor which is the outer conductor of said coaxial transmission line.

8. A pulse generator comprising:
    (a) a mode locked laser operable when activated to produce a series of output light pulses of short duration having a predetermined wavelength;
    (b) a transmission line at least a section of which is photoconductively responsive to change its impedance in response to one of said light pulses having said predetermined wavelength;
    (c) means applying a voltage across said transmission line;
    (d) one end of said transmission line being terminated in an open circuit and the other end of said transmission line being terminated in the characteristic impedance of the line;
    (e) a light switch intermediate said mode locked laser and said photoconductive section of said transmission line to which said series of light pulses are applied; said light switch being controllable to either pass a light pulse to said photoconductive section of said transmission line or prevent a light pulse from passing through the switch to reach the photoconductive section of said transmission line;
    (f) and control means responsive to at least one of said light pulses in said series for controlling said light switch to pass a subsequent one of said light pulses to said photoconductive section of said transmission lines.

9. The pulse generator of claim 8 wherein said control means includes a counter which is responsive to $n$ pulses applied thereto to produce an output which is coupled to said light switch to allow the $n+1$ pulse of a series from said mode locked laser to reach said photoconductive section of said transmission line.

10. The pulse generator of claim 8 wherein said transmission line is a coaxial line and said photoconductive section is a section of the inner conductor of said coaxial line.

11. A pulse generator comprising:
(a) light pulse means operable when activated to produce a short duration output light pulse having a predetermined wavelength;
(b) a transmission line at least a section of which is photoconductively responsive to change its impedance when a light pulse having said predetermined wavelength is applied thereto;
(c) means for applying a voltage across said transmission line;
(d) and means for activating said light pulse means to produce an output light pulse and for coupling said light pulse to said photoconductive section of said transmission line to produce from said transmission line an electrical output signal having a rise time in the picosecond range.

12. The pulse generator of claim 11 wherein said light pulse means is a laser.

13. The pulse generator of claim 12 wherein said photoconductive section is silicon.

References Cited

UNITED STATES PATENTS

| | | | |
|---|---|---|---|
| 2,978,652 | 4/1961 | Thomas | 250—211 X |
| 3,215,844 | 11/1965 | Wittwer | 250—211 X |
| 3,405,287 | 10/1968 | Miller | 307—268 |

RALPH G. NILSON, Primary Examiner

T. N. GRIGSBY, Assistant Examiner

U.S. Cl. X.R.

250—211, 227; 307—268, 312; 333—20